United States Patent
Watanabe

(10) Patent No.: US 9,942,454 B2
(45) Date of Patent: Apr. 10, 2018

(54) IMAGE CAPTURING APPARATUS AND CONTROL METHOD THEREOF, AND STORAGE MEDIUM

(71) Applicant: CANON KABUSHIKI KAISHA, Tokyo (JP)

(72) Inventor: Shinobu Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/001,900

(22) Filed: Jan. 20, 2016

(65) Prior Publication Data

US 2016/0212315 A1    Jul. 21, 2016

(30) Foreign Application Priority Data

Jan. 21, 2015   (JP) ................................. 2015-009796

(51) Int. Cl.
*H04N 5/262* (2006.01)
*H04N 5/232* (2006.01)
*H04N 5/374* (2011.01)

(52) U.S. Cl.
CPC ......... *H04N 5/232* (2013.01); *H04N 5/23296* (2013.01); *H04N 5/374* (2013.01)

(58) Field of Classification Search
CPC ................................................ H04N 5/23296
USPC ......................................... 348/240.99, 240.3
See application file for complete search history.

(56) References Cited

U.S. PATENT DOCUMENTS

| 4,467,361 A | * | 8/1984 | Ohno ................. G02B 23/243 250/208.1 |
| 6,486,917 B2 | * | 11/2002 | Iwasaki ............. H01L 27/14601 348/294 |
| 2005/0030408 A1 | * | 2/2005 | Ito ....................... H04N 5/2253 348/340 |
| 2013/0329113 A1 | * | 12/2013 | Takatsuka .......... H04N 5/23293 348/333.12 |
| 2014/0049683 A1 | * | 2/2014 | Guenter ................ H04N 5/262 348/360 |
| 2014/0240566 A1 | * | 8/2014 | Shizukuishi ...... H01L 27/14634 348/302 |
| 2016/0212330 A1 | * | 7/2016 | Li ..................... H04N 5/23229 |

FOREIGN PATENT DOCUMENTS

| JP | 4604307 B | 1/2011 |
| JP | 2012-182194 A | 9/2012 |

* cited by examiner

*Primary Examiner* — Anthony J Daniels
(74) *Attorney, Agent, or Firm* — Cowan, Liebowitz & Latman, P.C.

(57) ABSTRACT

An image capturing apparatus includes an image sensor in which a plurality of pixels are arrayed two-dimensionally, a driving unit that bends the image sensor, and a control unit that controls the driving unit to bend the image sensor at a predetermined curvature. The control unit controls the driving unit so that stress acting on the image sensor in the case where an image capture operation is not carried out is lower than stress acting on the image sensor in the case where an image capture operation is carried out.

8 Claims, 6 Drawing Sheets

FIG. 3

| | First Column | Second Column | Third Column | |
|---|---|---|---|---|
| TENTH ROW | Gb | B | Gb | ...... |
| NINTH ROW | R | Gr | R | ...... |
| EIGHTH ROW | Gb | B | Gb | ...... |
| SEVENTH ROW | R | Gr | R | ...... |
| SIXTH ROW | Gb | B | Gb | ...... |
| FIFTH ROW | R | Gr | R | ...... |
| FOURTH ROW | Gb | B | Gb | ...... |
| THIRD ROW | R | Gr | R | ...... |
| SECOND ROW | Gb | B | Gb | ...... |
| FIRST ROW | R | Gr | R | ...... |

| IMAGE CAPTURING OPERATION | ABSENT | | | | | PRESENT | | | | |
|---|---|---|---|---|---|---|---|---|---|---|
| ZOOM POSITION | Wide | M1 | M2 | M3 | Tele | Wide | M1 | M2 | M3 | Tele |
| SUCTION FORCE | Xmin | | | | | X0 | X1 | X2 | X3 | X4 |

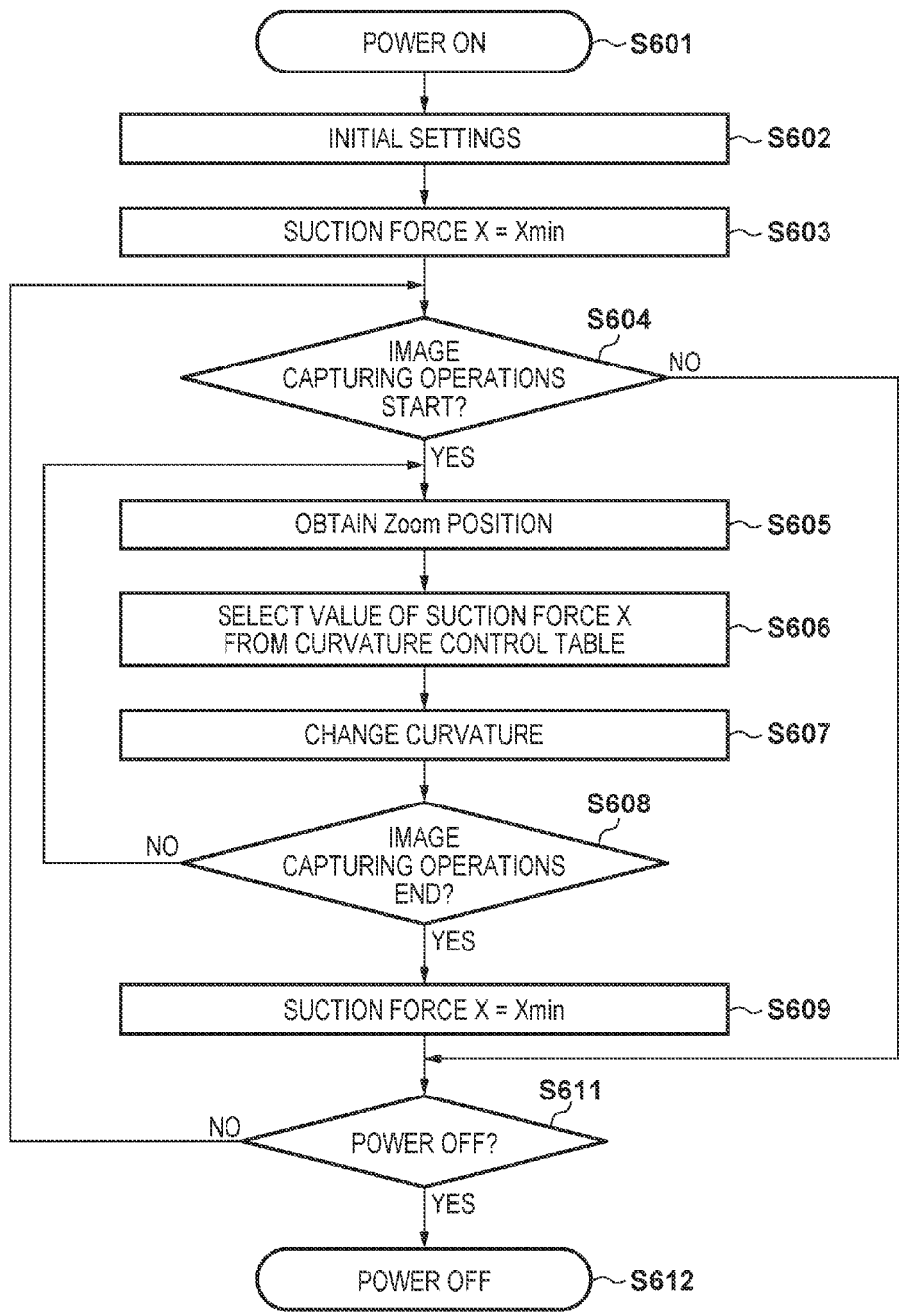

IMAGE CAPTURING APPARATUS AND CONTROL METHOD THEREOF, AND STORAGE MEDIUM

BACKGROUND OF THE INVENTION

Field of the Invention

The present invention relates to an image capturing apparatus and a control method thereof.

Description of the Related Art

Recently, large-format image sensors, at sizes of 1" or more, are being installed even in compact digital cameras. As a result, shooting images at extremely high sensitivities, shooting images at a shallow depth of field to evoke a bokeh effect, and so on, which thus far were only possible with single-lens reflex cameras, are now possible with compact digital cameras as well. Such large-format image sensors have become an essential piece of technology for distinguishing compact digital cameras from the types of cameras installed in smartphones, tablets, and the like.

However, in the case where a large-format image sensor is installed in a compact digital camera, increasing the size of the lens to handle the large-format image sensor will increase the size of the camera as a whole. Thus reducing the size of the lens becomes an issue when installing a large-format image sensor in a compact digital camera. However, if the size of the lens is reduced while ensuring the same performance as a large-format lens, there is a problem in that generally, the angle of incidence of light rays entering the lens (called a "light ray incidence angle" hereinafter) will increase.

Japanese Patent No. 4604307 proposes an image sensor whose image capturing surface has a bent structure as one way of solving this problem. By bending the image capturing surface, this image sensor can ensure that light rays from a subject entering through the lens are orthogonal to the image capturing surface.

Meanwhile, Japanese Patent Laid-Open No. 2012-182194 proposes an image capturing apparatus that employs an image sensor having a bent image capturing surface, in which the curvature of the image capturing surface can be variably controlled from a flat state to a bent state having a predetermined curvature in accordance with a movement amount of an optical lens system. In other words, the curvature of the image sensor can be changed in accordance with a zoom position, an aperture value (F-stop value), or the like of the optical lens system of the image capturing apparatus, which makes it possible to deform the image sensor to curvatures suited to different states in the optical lens system.

A structure in which the image capturing surface is bent and the curvature is variably controlled results in stress in the image sensor substrate itself, and that stress changes in accordance with the curvature of the image capturing surface. In other words, the stress produced when changing the curvature of the image sensor puts stress on the image sensor itself, which is thought to reduce the durability of the image sensor.

SUMMARY OF THE INVENTION

Having been achieved in light of the aforementioned issues, the present invention greatly reduces stress on an image sensor in an image capturing apparatus having a bent image sensor and a function for variably controlling the curvature of the image sensor.

According to a first aspect of the present invention, there is provided an image capturing apparatus comprising: an image sensor in which a plurality of pixels are arrayed two-dimensionally; a driving unit that bends the image sensor; and a control unit that controls the driving unit to bend the image sensor at a predetermined curvature, wherein the control unit controls the driving unit so that stress acting on the image sensor in the case where an image capture operation is not carried out is lower than stress acting on the image sensor in the case where an image capture operation is carried out.

According to a second aspect of the present invention, there is provided a method for controlling an image capturing apparatus that includes an image sensor in which a plurality of pixels are arrayed two-dimensionally and a driving unit that bends the image sensor, the method comprising: controlling the driving unit to bend the image sensor at a predetermined curvature, wherein in the controlling, the driving unit is controlled so that stress acting on the image sensor in the case where an image capture operation is not carried out is lower than stress acting on the image sensor in the case where an image capture operation is carried out.

According to a third aspect of the present invention, there is provided a computer-readable storage medium in which is stored a program for causing a computer to execute each step of a control method for an image capturing apparatus that includes an image sensor in which a plurality of pixels are arrayed two-dimensionally and a driving unit that bends the image sensor, wherein the control method includes controlling the driving unit to bend the image sensor at a predetermined curvature; and in the controlling, the driving unit is controlled so that stress acting on the image sensor in the case where an image capture operation is not carried out is lower than stress acting on the image sensor in the case where an image capture operation is carried out.

Further features of the present invention will become apparent from the following description of exemplary embodiments (with reference to the attached drawings).

BRIEF DESCRIPTION OF THE DRAWINGS

FIG. 3 is a diagram illustrating part of a color filter array in an image sensor.

FIG. 6 is a flowchart illustrating a curvature control procedure according to an embodiment.

DESCRIPTION OF THE EMBODIMENTS

Figure 1:
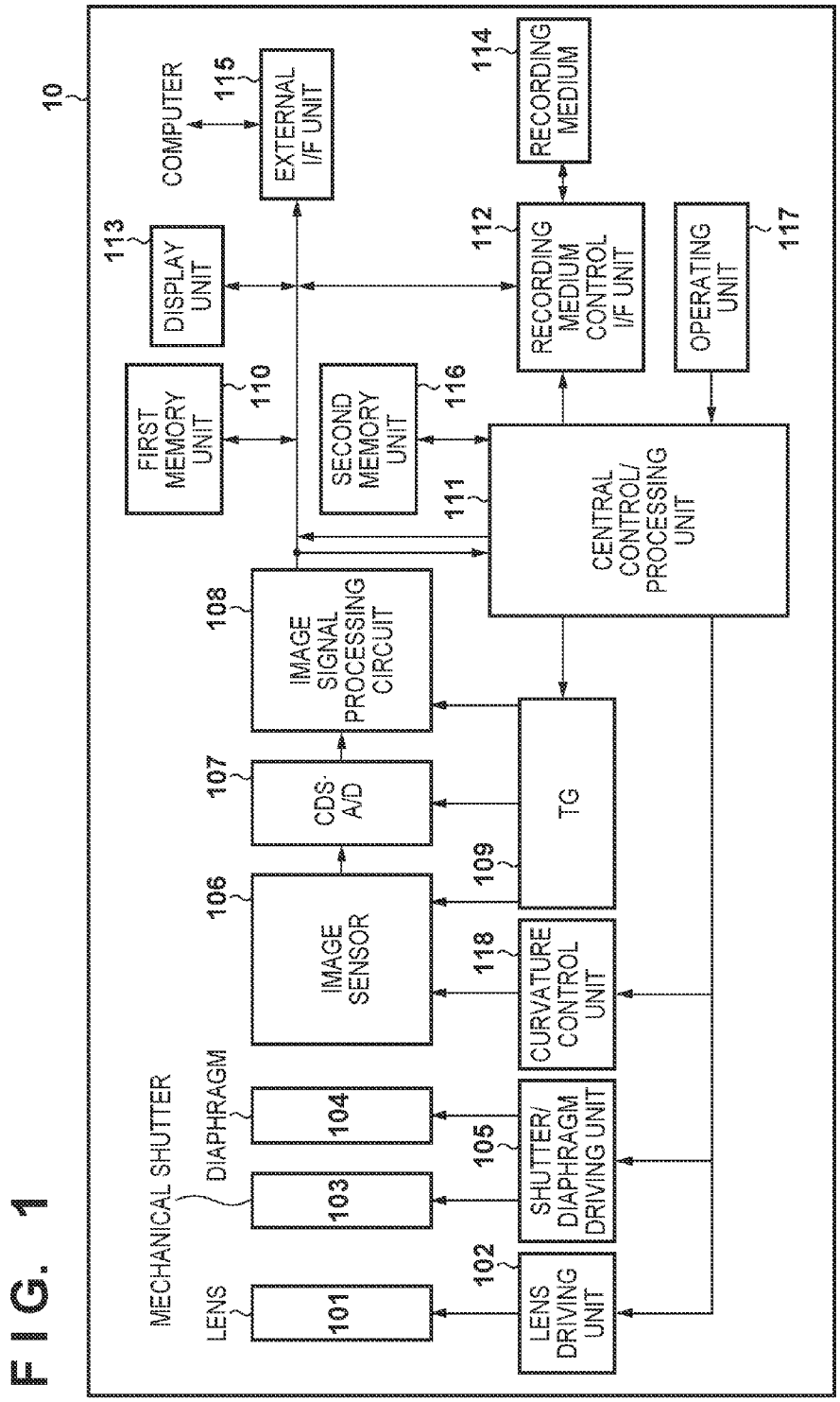
FIG. 1 is a block diagram illustrating the configuration of an image capturing apparatus according to an embodiment of the present invention.

Hereinafter, an embodiment of the present invention will be described in detail with reference to the appended drawings. FIG. 1 is a block diagram illustrating the configuration of an image capturing apparatus according to an embodiment of the present invention. This image capturing apparatus is, for example, a digital still camera having a video recording function, a video camera, or the like.

As illustrated in FIG. 1, an image capturing apparatus 10 includes an imaging lens 101, a lens driving unit 102, a mechanical shutter 103, a diaphragm 104, and a mechanical shutter/diaphragm driving unit (also called a "shutter/diaphragm driving unit") 105. The image capturing apparatus 10 also includes an image sensor 106, a CDS-A/D conversion circuit (also called "CDS-A/D") 107, an image signal processing circuit 108, a timing generation unit (also called "TG") 109, a first memory unit 110, and a central control/processing unit 111. The image capturing apparatus 10 furthermore includes a recording medium control interface unit (also called a "recording medium control I/F unit") 112, a display unit 113, a second memory unit 116, an operating unit 117, and a curvature control unit 118 that controls the curvature of the image sensor. A recording medium 114 is connected to the image capturing apparatus 10 by the recording medium control I/F unit 112. The image capturing apparatus 10 can be connected to an external computer or the like by an external interface unit (also called an "external I/F unit") 115.

The lens 101 is a zoom lens, and can vary a focal length from a wide end (a wide angle-side) to a tele end (a telephoto-side) under the control of the lens driving unit 102. The mechanical shutter 103 mechanically controls an illumination time of light entering the diaphragm 104 and the image sensor 106 in the later stages of the apparatus. The mechanical shutter 103 and the diaphragm 104 are driven and controlled by the shutter/diaphragm driving unit 105.

In FIG. 1, a subject image adjusted to an appropriate light amount by the diaphragm 104 is formed on an image capturing surface of the image sensor 106 by the lens 101. The subject image formed on the image capturing surface of the image sensor 106 undergoes correlated double sampling, gain adjustment, and A/D conversion, which converts an analog signal into a digital signal, in the CDS-A/D 107, and is then sent to the image signal processing circuit 108. The image signal processing circuit 108 generates image data by carrying out various types of image signal processes such as low-pass filtering for reducing noise and shading processing, various types of correction processes such as defect correction, dark shading correction, and black subtraction processing, compression processing, and so on.

The central control/processing unit 111 carries out control of and various types of operations for the image capturing apparatus as a whole. The TG 109 generates a driving pulse for driving the image sensor 106 on the basis of a control signal from the central control/processing unit 111. The first memory unit 110 temporarily stores the image data. The recording medium control interface unit 112 records or reads out the image data into or from the recording medium 114. The display unit 113 displays the image data. The recording medium 114 is a removable storage medium such as a semiconductor memory or the like. The external interface unit 115 communicates with the external computer or the like. The second memory unit 116 stores various types of parameters, such as processing results from the central control/processing unit 111, shooting conditions, and so on. Information regarding driving conditions of the image capturing apparatus set by a user through the operating unit 117 is sent to the central control/processing unit 111, and the image capturing apparatus is controlled as a whole on the basis of that information.

The operating unit 117 includes a switch and a zoom lever, and an ON determination is sent to the central control/processing unit 111 in the case where the user has pushed the switch, whereas an OFF determination is sent to the central control/processing unit 111 in the case where the user has not pushed the switch. When the user manipulates the zoom lever, a zoom position corresponding to that operation is sent to the central control/processing unit 111. The operating unit 117 furthermore includes a menu button through which the user can make various types of settings. The curvature control unit 118 drives the image sensor 106 on the basis of a command from the central control/processing unit 111, bending the image sensor 106 by variably controlling the curvature of the image sensor 106.

Figure 2:
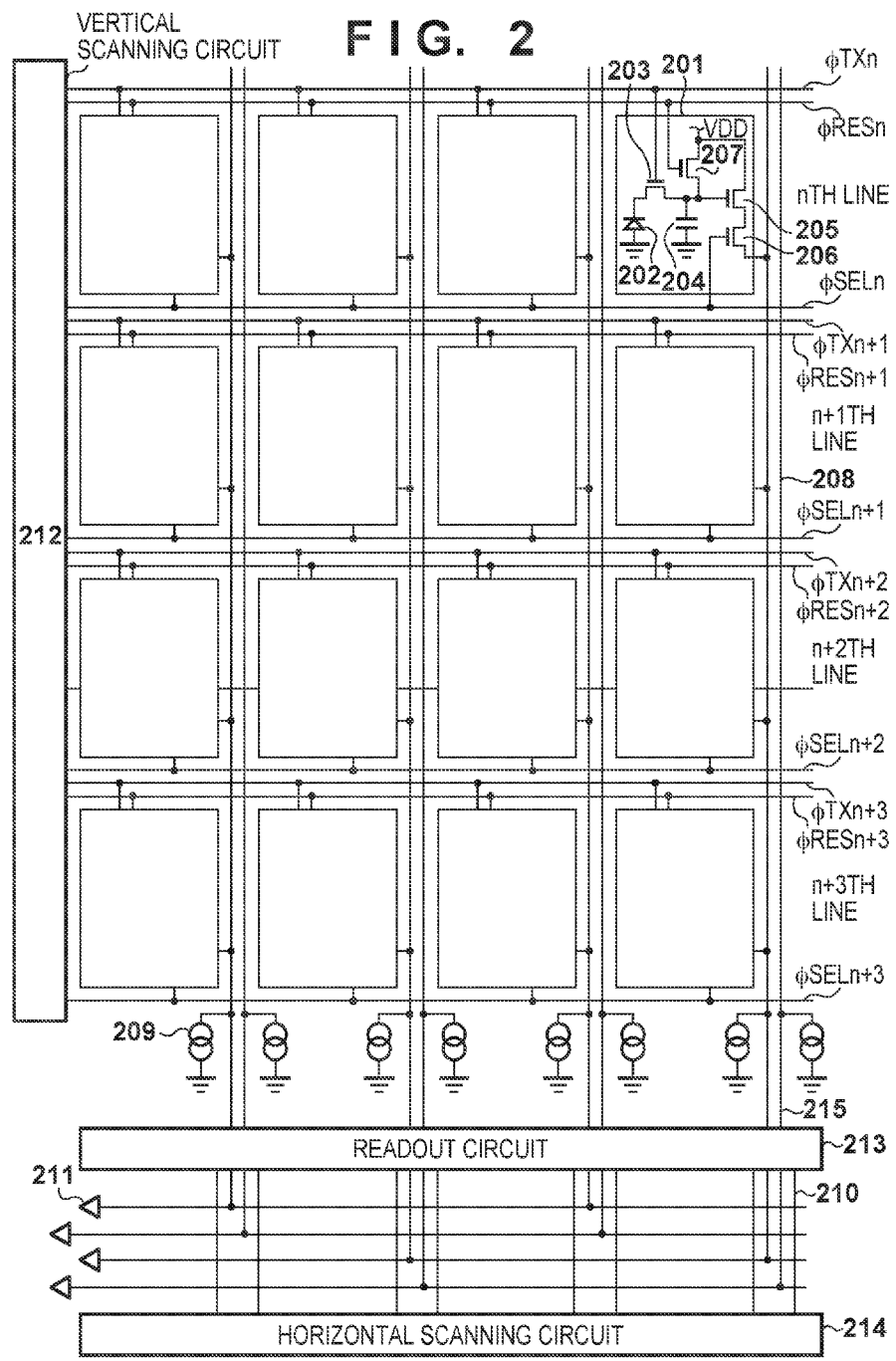
FIG. 2 is a diagram illustrating the electrical configuration of an image sensor according to an embodiment of the present invention.

FIG. 2 is a diagram schematically illustrating the configuration of the image sensor 106 according to the present embodiment. As illustrated in FIG. 2, the image sensor 106 has a plurality of unit pixels 201. Each unit pixel 201 has a photodiode (PD) 202, a transfer switch 203, and a floating diffusion (FD) 204. Furthermore, each unit pixel 201 has an MOS amplifier 205, a selection switch 206, and a reset switch 207 functioning as a source follower. Aside from the unit pixels 201, the image sensor 106 includes vertical output lines 208, a constant current source 209 serving as a load of the MOS amplifier 205, selection signal lines 210, output amplifiers 211, a vertical scanning circuit 212, a readout circuit 213, and a horizontal scanning circuit 214. Although FIG. 2 illustrates four rows by four columns of unit pixels 201, this is merely to facilitate understanding of the configuration, and in reality, an extremely large number of unit pixels 201 are arrayed two-dimensionally.

In the unit pixel 201, light is converted into a charge by the PD 202, and the charge generated by the PD 202 is transferred from the PD 202 to the FD 204 in response to a transfer pulse $\varphi TX$ being applied to the transfer switch 203; the charge is then temporarily accumulated in the FD 204. A floating diffusion amplifier is constituted by the FD 204, the MOS amplifier 205, and the constant current source 209. The selection switch 206 turns on in response to a selection pulse $\varphi SEL$ being applied, and the signal charge accumulated in the FD 204 of the selected pixel is converted into a voltage, which is then outputted to the readout circuit 213 through the vertical output line 208. Furthermore, the signal output from the readout circuit 213 is selected by the horizontal scanning circuit 214 outputting a selection signal to the selection signal line 210, and the selected output signal is output to the exterior of the image sensor 106 through the output amplifier 211. The charge accumulated in the FD 204 is reset by applying a reset pulse $\varphi RES$ to the reset switch 207. The vertical scanning circuit 212 carries out driving to selectively turn the transfer switch 203, the selection switch 206, and the reset switch 207 on and off.

FIG. 3 is a diagram illustrating part of a color filter array used by the image sensor illustrated in FIG. 2. FIG. 3 illustrates a case where a first color filter is red (R), a second color filter is green (Gr), a third color filter is green (Gb), and a fourth color filter is blue (B). The particular arrangement of this color filter array is, among primary color filter arrays, called a Bayer array, and provides a high resolution and superior color reproduction properties.

Figure 4:
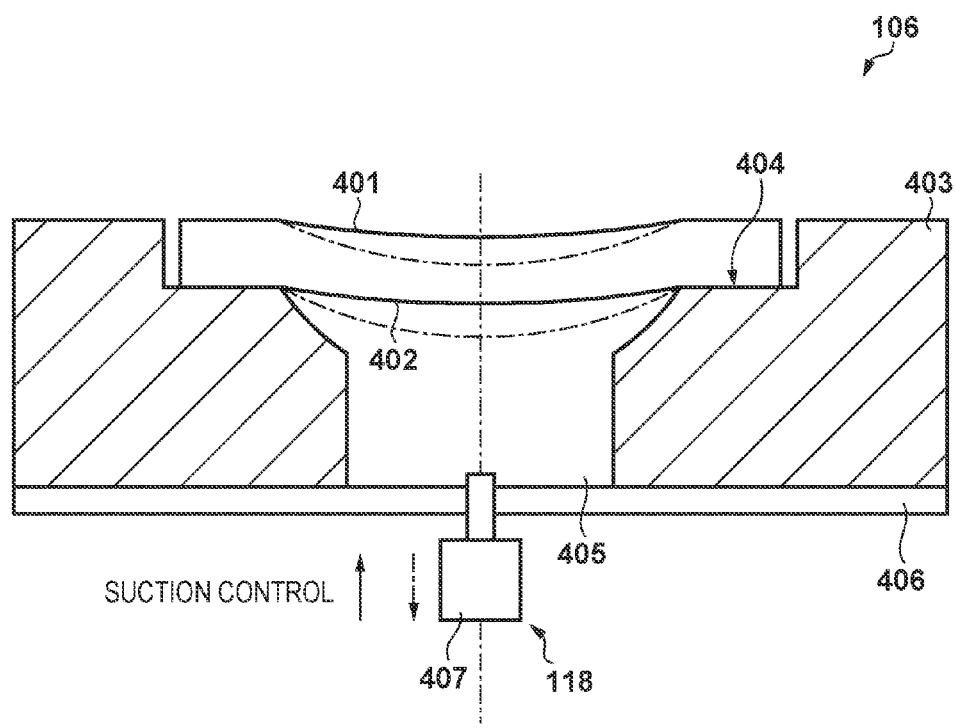
FIG. 4 is a diagram illustrating an overview of a curvature control mechanism for an image capturing surface of an image sensor.

An overview of a curvature control mechanism for the image capturing surface of the image sensor 106 will be given next using FIG. 4. FIG. 4 illustrates a cross-section of the image sensor 106 to which the curvature control unit 118 is connected.

As illustrated in FIG. 4, the image sensor 106 includes a semiconductor chip 401, a bent portion 402 of the semiconductor chip 401, a base 403, a flat surface 404 of the base 403, an opening 405 in the base 403, a base plate 406 that seals the opening 405 in the base 403, and a suction unit 407.

In the present embodiment, the image capturing surface is formed on the upper side of the semiconductor chip 401 in FIG. 4.

The semiconductor chip 401 has in a central area an image capturing region in which the unit pixels 201 are arrayed two-dimensionally, and has in a peripheral area the peripheral circuits 209 to 215 illustrated in FIG. 2. The central area of the semiconductor chip 401 forms the bent portion 402, which is bent three-dimensionally in an arc shape or the like toward the opening 405 in the base 403. A flat portion around the rim of the bent portion 402 in the semiconductor chip 401 is anchored to the flat surface 404 of the base 403 using an adhesive layer, thus supporting the semiconductor chip 401 on the base 403.

The curvature control unit 118, which includes the suction unit 407, is attached to the base plate 406. The suction unit 407 is configured to be capable of controlling the curvature of the bent portion 402 by sucking air from within the opening 405 that is sealed airtight by the base plate 406 so as to control the air pressure (negative pressure) within the opening 405, which in turn causes the semiconductor chip 401 to bend out-of-plane. The dot-dash lines in FIG. 4 indicate the bent portion 402 of the semiconductor chip 401 in a state bent by the curvature control unit 118.

Figures 5A, 5B:
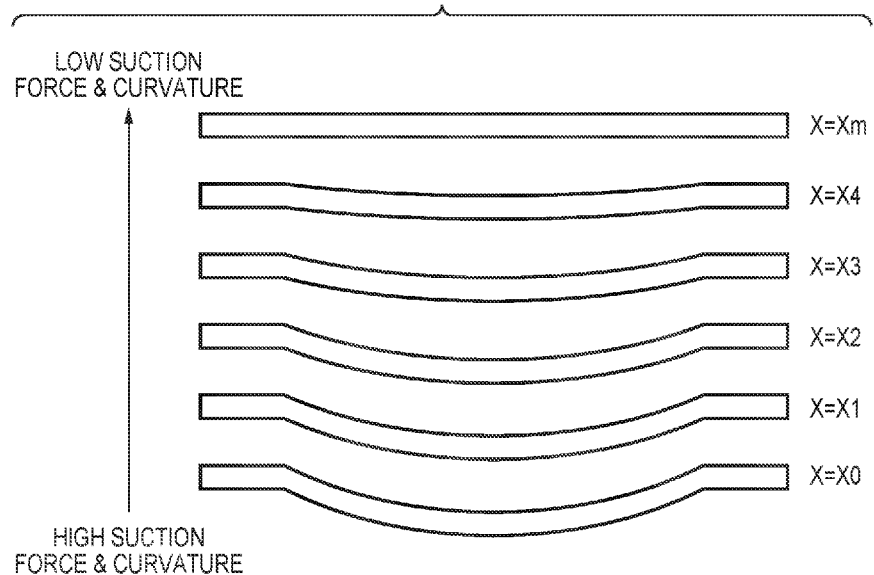
FIGS. 5A and 5B are diagrams illustrating a curvature control table according to an embodiment.

Next, details of the curvature control of the image sensor according to the present embodiment will be described using FIGS. 5A and 5B. Here, suction force of the suction performed by the suction unit 407 is indicated by X. In other words, the greater the suction force X, the greater the curvature of the bent portion 402, and the smaller the suction force X, the smaller the curvature of the bent portion 402. Meanwhile, in the present embodiment, a curvature control table such as that illustrated in FIG. 5A is stored in the second memory unit 116. FIG. 5A is a table indicating relative relationships between the presence or absence of image capture operations, a zoom position of the imaging lens 101, and the suction force X applied to the bent portion 402 of the image capturing surface of the image sensor 106. Stress on the image sensor 106 changes in proportion with changes in the suction force X. In other words, the greater the suction force X, the greater the stress on the image sensor 106.

Image capture operations being "absent" refers to a state where image capture operations are not carried out. In other words, this refers to a state where an image signal is not read out from the image sensor 106, a state where a menu is being displayed in a liquid-crystal display screen, a state where captured images, videos, and so on are being played back and displayed, a state where the power of the image capturing apparatus 10 is off, or the like.

As indicated in the curvature control table in FIG. 5A, in a state where image capture operations are not being carried out, the suction force applied to the image sensor 106 is controlled so that the curvature of the image sensor 106 is a minimum Xmin regardless of the zoom position of the imaging lens 101. In other words, the stress on the image sensor 106 is also a minimum. On the other hand, in a state where image capture operations are being carried out, the suction force applied to the image sensor 106 is controlled to change to one of X0, X1, X2, X3, and X4 in accordance with the zoom position of the imaging lens 101 (the optical information).

FIG. 5B is a conceptual diagram illustrating a relationship between the shape of the bent portion 402 in the case where the curvature of the bent portion 402 of the semiconductor chip 401 has been changed and the value of the suction force X applied to the bent portion 402 when bending the bent portion 402 to that curvature. The lens 101 according to the present embodiment is configured so that during image capture operations, the angle of incidence of light on the image sensor 106 is greater the closer the zoom position is to the wide end (the wide angle-side).

In this case, it is necessary to increase the curvature of the semiconductor chip 401 the closer the zoom position is to the wide (wide angle) side. The suction force X also increases in accordance therewith. Furthermore, because the configuration is such that the suction force X is at the minimum value Xmin when image capture operations are not being carried out, relative magnitudes of the suction force X correspond to a relationship such as that indicated below. In other words, the stress on the image sensor 106 also has the same relationship.

$$X0 > X1 > X2 > X3 > X4 > Xmin \geq 0$$

Although the curvature control table illustrated in FIG. 5A indicates zoom points such as wide, M1, and so on as the zoom positions, it should be noted that a similar curvature control table can be created by denoting the focal length at each zoom position instead.

Next, details of the control of the suction force according to the present embodiment will be described using the flowchart illustrated in FIG. 6. This routine starts when a user switches a power button included in the operating unit 117 of the image capturing apparatus 10 on in step S601.

When the power is turned on, the process advances to step S602, where the central control/processing unit 111 makes initial settings for operating the image capturing apparatus 10. In step S603, the suction force X is set to Xmin, which is the minimum value, in the curvature control unit 118.

In step S604, it is determined whether or not a second mode, in which image capture operations that read out an image signal from the image sensor 106 such as a live view mode that plays back and displays a shot video in the liquid-crystal display screen without carrying out recording operations, a case where operations for recording a shot video or still image are carried out, or the like, has been started by the user. The process advances to step S605 in the case where it is determined in step S604 that the second mode has been started.

In step S605, the central control/processing unit 111 obtains a zoom position of the imaging lens 101 set by the user. In step S606, the central control/processing unit 111 selects a value for the suction force X to be set in the curvature control unit 118 on the basis of the curvature control table illustrated in FIG. 5A, in accordance with the zoom position obtained in step S605.

In step S607, the curvature control unit 118 carries out driving that causes the image sensor 106 to bend by sucking the image sensor 106 at the suction force X selected in step S606 and sets the bent portion 402 of the image sensor 106 to a predetermined curvature. In step S608, the process returns to step S605 in the case where the image capture operations are to be continued, and the operation for selecting the suction force X in accordance with the set zoom position is repeated.

However, in the case where the image capture operations have ended in step S608, the process advances to step S609, where Xmin is set as the suction force X in the curvature control unit 118.

On the other hand, in the case where it is determined in step S604 that the second mode in which image capture operations are carried out is not started, the mode is determined to be a first mode in which image capture operations are not carried out, and the process advances to step S611.

In step S611, it is determined whether or not the power is to be turned off. The process returns to step S604 in the case where it is determined that the power is not to be turned off. However, in the case where it is determined in step S611 that the user has made an operation for turning the power off, the process advances to step S612 and the power is turned off.

As described thus far, according to the present embodiment, the following control is carried out in an image capturing apparatus in which an image sensor having an image capturing surface that can be bent is installed and that is capable of changing the curvature of the image sensor in accordance with the zoom position of a lens. That is, the curvature is set to a minimum in a first mode in which image capture operations are not carried out, the first mode corresponding to a state in which an image signal is not read out from the image sensor, a state in which a menu is displayed in a liquid-crystal display screen, a state in which a shot still image, video, or the like is played back and displayed, a state in which the power of the image capturing apparatus 10 is off, or the like. Accordingly, stress acting on the image sensor can be kept to a minimum, and the durability of the image sensor can be improved as a result.

The present embodiment has described, as a method for changing the curvature, a method that controls the curvature of the bent portion by controlling the air pressure within the opening using the curvature control unit including the suction unit. However, the curvature can be controlled through another method, such as by using a piezoelectric element.

Furthermore, although the present embodiment describes the image sensor 106 and the CDS-A/D 107 as separate elements, the same control can be carried out even in the case where the CDS-A/D 107 is disposed within the image sensor 106 by employing a stacked structure in which a plurality of semiconductor substrates are stacked together, for example.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009796, filed Jan. 21, 2015 which is hereby incorporated by reference herein in its entirety.

What is claimed is:

1. An image capturing apparatus comprising:
an image sensor in which a plurality of pixels are arrayed two-dimensionally;
a driver that bends the image sensor; and
a controller that controls the driver to bend the image sensor a predetermined curvature by controlling the driver on the basis of a table for curvature control based on optical information regarding a zoom position of an imaging lens,
wherein the controller is configured to determine whether an image capture operation is started and to determine whether an image capture operation is terminated,
wherein the controller controls the driver, in response to determining that an image capture operation is started, to bend the image sensor to a curvature based on the optical information, and in response to determining that an image capture operation is terminated, controls the driver so that stress acting on the image sensor is less than in a case where an image capture operation is carried out regardless of the optical information of the imaging lens,
wherein in a case where an image capture operation is carried out, the controller sets the curvature to which the image sensor is bent to a greater value in the case where the zoom position of the imaging lens is on a wide angle-side than in the case where the zoom position is on a telephoto-side, and
wherein the image capture operation is an operation for reading out an image signal from the image sensor.

2. The image capturing apparatus according to claim 1, wherein the driver bends the image sensor by sucking, the image sensor.

3. The image capturing apparatus according to claim 1, wherein the driver ends the image sensor using, a piezoelectric element.

4. The image capturing apparatus according to claim 1, wherein the image sensor has a stacked structure in which a plurality of semiconductor substrates are stacked together.

5. The image capturing apparatus according to claim 1, wherein in a case where an image capture operation is not carried out, the controller controls the drive so that stress acting on the image sensor is less than in the case where an image capture operation is carried out regardless of the optical information of the imaging lens, and
wherein the case where an image capture operation is neat carried out includes any of a case where no signal is read out from the image sensor, a case where the image capturing apparatus is turned off, a case where the image capturing apparatus is displaying a menu, and a case where the image capturing apparatus is playing back an image.

6. The image capturing apparatus according to claim 1, wherein the image capture operation includes one or more of a live view operation, a still image capture operation and a moving image capture operation.

7. A method for controlling an image capturing apparatus that includes image sensor in which a plurality of pixels are arrayed two-dimensionally and a driver that bends the image sensor, the method comprising:
- determining whether an image capture operation is started or terminated;
- controlling the driver to bend the image sensor at a predetermined curvature on the basis of a table for curvature control based on optical information regarding zoom position of an imaging lens,
- wherein the controlling, the driver is controlled, in response to determining that an image capture operation is started, to bend the image sensor to a curvature based on the optical information, and in response to determining that an image capture operation is terminated, the driver is controlled so that stress acting on the image sensor less than in a case where an image capture operation is carried out regardless of the optical information of the imaging lens,
- wherein in a case where an image capture operation is carried out, the curvature is set so that the image sensor is bent to a greater value in the case where the zoom position of the imaging lens is on a wide angle-side than in the case where the zoom position is on a telephoto-side, and
- wherein the image capture operation is an operation for reading out an image signal from the image sensor.

8. A computer-readable storage medium in which is stored a program for causing a computer to execute each step of a control method for an image capturing apparatus that includes an image sensor in which a plurality of pixels are arrayed two-dimensionally and a driver that bends the image sensor,
- wherein the control method includes:
- determining whether an image capture operation is started or terminated;
- controlling the driver to bend the image sensor at a predetermined curvature on the basis of a table for curvature control based on optical information regarding a zoom position of an imaging lens; and
- in the controlling, the driver is controlled, in response to determining that an image capture operation is started, to bend the image sensor to a curvature based on the optical information, and in response to determining that an image capture operation is terminated, controls the driver so that stress acting on the image sensor is less than in a case where an image capture operation is carried out regardless of the optical information of the imaging lens,
- wherein in a case where an image capture operation is carried out, the curvature is set so that the image sensor is bent to a greater value in the case where the zoom position of the imaging lens is on a wide angle-side than in the case where the zoom position is on a telephoto-side, and
- wherein the image capture operation is an operation for reading out an image signal from the image sensor.

* * * * *